United States Patent [19]

Beasley

[11] 4,217,421
[45] Aug. 12, 1980

[54] ANION EXCHANGE RESINS PREPARED FROM CROSSLINKED POLYSTYRENESULFONYLCHLORIDE

[75] Inventor: Glenn H. Beasley, Cheltenham, Pa.

[73] Assignee: Rohm and Haas Company, Philadelphia, Pa.

[21] Appl. No.: 897,067

[22] Filed: Apr. 17, 1978

Related U.S. Application Data

[63] Continuation-in-part of Ser. No. 810,340, Jun. 27, 1977, abandoned.

[51] Int. Cl.$^2$ ............................ C08F 8/32; C08F 8/38
[52] U.S. Cl. ......................................... 521/32; 521/33
[58] Field of Search ....................... 260/2.1 E, 79.3 R; 521/32, 33

[56] References Cited

U.S. PATENT DOCUMENTS

| 2,778,813 | 1/1957 | Gaspar et al. | 260/79.3 |
| 2,867,611 | 1/1959 | Teot | 260/79.3 |
| 2,906,715 | 9/1959 | Hagge et al. | 260/2.1 |
| 3,128,257 | 4/1964 | Hoover et al. | 260/2.2 |
| 3,133,030 | 5/1964 | Wheaton et al. | 260/2.2 |

Primary Examiner—Stanford M. Levin
Attorney, Agent, or Firm—Louis F. Kline, Jr.

[57] ABSTRACT

Novel anion exchange resins containing a crosslinked aromatic backbone resin with sulfonamide functional ion exchange groups on the aromatic rings and a process for producing the same.

21 Claims, No Drawings

ANION EXCHANGE RESINS PREPARED FROM CROSSLINKED POLYSTYRENESULFONYLCHLORIDE

This application is a continuation-in-part of my copending U.S. patent application Ser. No. 810,340 filed June 27, 1977, now abandoned.

The present invention is directed to a novel group of polystyrenyl and substituted polystyrenyl sulfonyl chloride resin intermediates, the polystyrenyl sulfonamide anion exchange resins derived therefrom, and the novel methods of preparing the same. In a preferred aspect the invention relates to polystyrenyl sulfonamide anion exchange resins having a styrene (substituted styrene)/divinylbenzene (DVB) backbone and a method of chlorosulfonating styrene/DVB copolymers using a chlorinating agent to avoid the presence of undesirable sulfonic acid groups in the intermediate copolymer.

The bulk of conventional strong and weak base anion exchange resins are presently commercially prepared by chloromethylation of styrene/DVB copolymers followed by amination. This process requires the use of chloromethyl ether or bis-chloromethyl ether, which compounds have recently been suspected of having carcinogenic properties, promoting researchers to investigate other modes of synthesis of anion exchange resins. One route indicated by the prior art, but deficient in results, involves chlorosulfonation of the resin matrix followed by amidation. U.S. Pat. No. 2,867,611 describes the reaction of uncrosslinked polystyrene sulfonic acid with thionyl chloride (SOCl$_2$) to prepare the corresponding sulfonyl chlorides of polystyrene homopolymer resins, which products can be further reacted with primary or secondary amines or ammonia. The only exemplary elucidation of this broad disclosure of amidation is in Example 7 wherein polystyrene polysulfonyl chloride is treated with anhydrous ammonia gas to yield polystyrene polysulfonamide, a resin which is not an operable anion exchange material due to the absence of active ion exchange sites.

In U.S. Pat. No. 2,900,352 is disclosed a method of making an anion exchange resin by reacting a linear polymer of styrene with a complex of chlorosulfonic acid, an alcohol and formaldehyde to introduce active side chains and cause crosslinking of the polymer, followed by amination. The presence of formaldehyde and an alcohol appears to result in formation of a polyvinyl benzyl chloride resin instead of a polystyrenyl sulfonyl chloride resin. Accordingly, the final products are similar to conventional resins prepared by chloromethylation techniques, i.e., they have a methylene group attaching the anion exchanging group to the aromatic ring of the polymer.

Czech No. 120,156 (*Chem. Abs. vol.* 68, 69699f, 1968) teaches the chlorosulfonation of a suspension copolymer of styrene-divinylbenzene, followed by treatment with hydrazine hydrate to produce a macroreticular sorbent for keto compounds. U.S.S.R. No. 291,928 (*Chem. Abs. vol.* 75, 21715a, 1971) teaches the reaction of sulfochlorinated crosslinked styrene copolymers with hydroxylamine. The products resulting are not anion exchange resins.

S. Goldstein et al. "Synthetic Aspects of Selective Ion Exchangers", *Israel Journal of Chemistry, vol.* 10, 1972, pp. 893–898, treat chlorosulfonated, crosslinked polystyrene with guanidine and dimethyl amine. The guanidine product resin would be unstable if used under normal conditions for an anion exchange resin. The dimethyl amine product resin would have no active sites for ion exchange.

U.S. Pat. No. 2,906,715 (corresponding to British Specification No. 795,698) teaches the chlorosulfonation of styrene polymers followed by reaction with ammonia or a primary or secondary amine or polyamine. Compared to the anion exchange resins of this invention, the weak base ion exchange products prepared according to this prior art's teachings are deficient in having an unacceptably high rinse requirement due to (1) presence of primary and secondary amine groups, (2) substantial quantities of sulfonic acid groups. Ion exchange resins when produced using polyamines with more than a single primary or secondary amine group, such as in U.S. Pat. No. 2,906,715, have inferior kinetic performance. It is believed that the kinetic deficiency is due largely to the fact that the resins disclosed by said reference have a high percentage of the so-called "2:1 reaction" product, that is, product resulting from the reaction of two amine groups from one polyamine molecule with two sulfonyl chloride groups on different aromatic rings of the polymer. In contrast, the resins of the present invention have no appreciable product of the 2:1 reaction type.

I have now discovered a novel and highly effective class of anion exchangers, novel intermediates for producing the same and novel processes for the manufacture of such intermediates and anion exchangers. The novel anion exchange resins of this invention have the general formula:

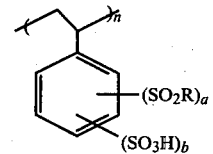

wherein R is selected from polyamines and quaternary ammonium salts, in either case containing a single primary or secondary amine group which is linked to the sulfonyl group of the polymer, and also at least one functional ion exchange group selected from tertiary amine and quaternary ammonium groups and mixtures thereof, and "a" is a number equal to or less than 2, preferably about 0.7 to 2.0 and more preferably 0.9 to 1.5 and "b" is a number from 0 to about 0.4, normally 0.001 to 0.4. Although in general it is desirable to have the anion resin free of sulfonic acid groups, it may be desirable in some applications, because of improved resin performance or a lower manufacturing cost, for one resin to have a controlled amount of sulfonic groups. This can be accomplished in either of two ways, either by lowering the amount of chlorinating agent or by reducing the quantity of amidating agent. The expression

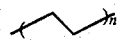

is used above to denote a polymer chain and for the same purpose elsewhere throughout the specification and in the claims. Other noninterfering substituents derived from the monovinyl monomer(s) used in preparing the polymer backbone may also be attached to the aromatic ring of the polymer.

In general, my process utilizes the ubiquitous crosslinked polystyrene, as defined hereinafter, well-known in ion exchange resin as starting material, but deviates from the usual chloromethylation process in that the crosslinked polystyrene is subjected to chlorosulfonation before being functionalized with an amine. A typical simplified reaction is as follows:

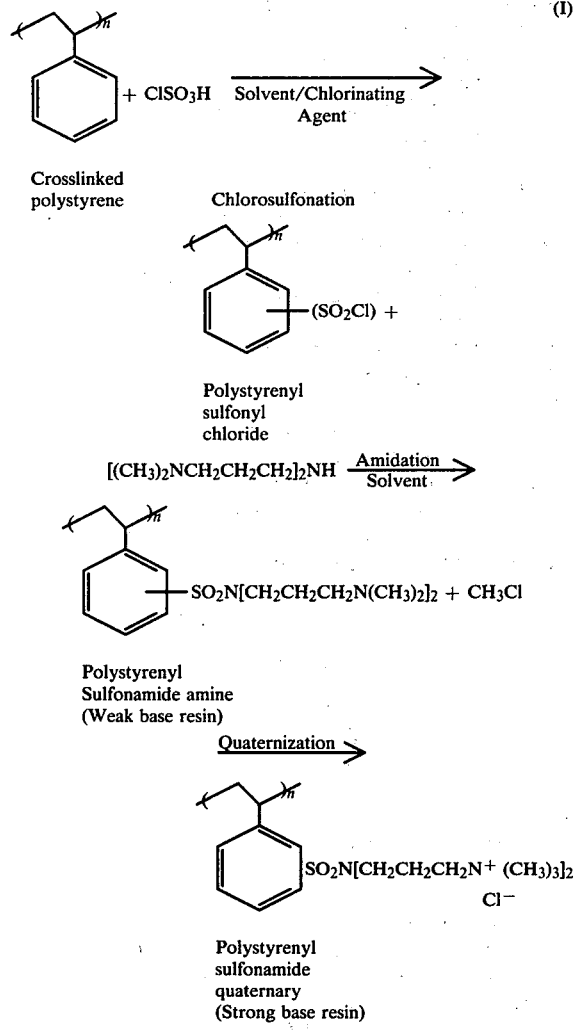

For convenience in describing the present invention, the resin backbone is denoted by the terms "polystyrenyl" or "polystyrene" and the chemical structure formula of pure polystyrene is used to represent such backbone. However, these terms and formulas are intended to embrace crosslinked polymers of styrene as well as related polymers of the other well-known monovinyl aromatic monomers such as vinyl toluene, ethyl vinyl benzene, chlorostyrene, vinyl naphthalene and the like, and mixtures thereof. Alternatively herein the term "substituted polystyrene" is intended to relate to polymers derived from the monomers related to styrene structurally. Polymers from these other monomers or mixtures of comonomers with or without styrene exhibit essentially the same performance characteristics and hence advantage as a polystyrene produced from pure styrene monomer, when chlorosulfonated and amidated by the method of the invention. To illustrate, a comonomer mixture of 50% styrene and 50% ethyl vinyl benzene may be polymerized together with a minor amount of polyvinyl benzene crosslinker to furnish a "polystyrenyl" backbone which may be chlorosulfonated and amidated to yield the novel products of this invention. Accordingly, the backbone resin of this invention shown as a styrene-derived polymer in the formulas, may be derived from monomers of styrene or related monomers having substituents on the aromatic ring, all of which are generally known in the ion exchange art as having about equivalent properties and performance. Styrene is, nevertheless, the preferred monovinyl monomer.

The resins of this invention may be useful in any conventional resin application. Typical applications include water treatment (deionization, deacidification, desalination, silica removal), hydrometallurgy (metals recovery such as uranium, zinc, silver), food processing (sugar decolorization, and deashing, deacidification of edible oils), reaction catalysis (ester formation), waste treatment (iron cyanide removal, dye removal), medical (pH control agent), deodorant additive, and analytical chemistry (chromatograph separations). These resins will also work in mixed beds such as a Stratabed (mixture of weak base resin and strong base resins) or a Monobed (strong base resin and a strong acid resin).

The invention will now be described following the flow of the typical reaction (I) above with all percentages by weight unless otherwise indicated.

Chlorosulfonation by the known method (see U.S. Pat. No. 2,906,715, mentioned above) using chlorosulfonic acid alone produces intermediates undesirably high in sulfonic acid groups ($-SO_3H$) which are nonreactive with amidating agents and further result in high rinse requirements in the weak base anion resins. I have found that the number of sulfonic acid groups can be minimized substantially by utilizing an additional reagent during chlorosulfonation, which reagent for convenience herein, shall be termed a "chlorinating agent". Although the mechanism by which sulfonic acid groups are avoided has not been proved, it is possible that the sulfonic acid groups result from liberated sulfuric acid according to the following equilibrium:

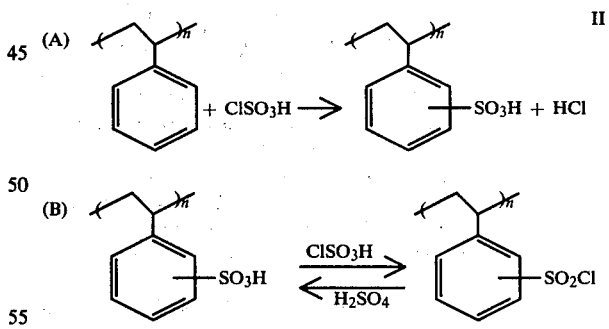

It appears that equilibrium may be shifted to the right in equation II(B) by use of a chlorinating agent to react with the sulfuric acid liberated in the reaction. Another possibility is that the chlorinating agent reacts directly with the sulfonic acid group to form sulfonyl chloride groups.

Chlorinating agents useful by the present invention are those materials which can react with the acid liberated or the sulfonic acid group. Typical chlorinating agents include thionyl chloride, chlorine, sulfur dichloride, sulfur monochloride, sulfuryl chloride, phosphorus trichloride, carbon tetrachloride, phosphorus pentachloride, methyl chloroform, phosphorus oxychloride, and the like.

The method of chlorosulfonation taught herein but utilizing a chlorinating agent also produces an increase in the number of sulfonylchloride groups attached to the crosslinked polystyrene. Again, while the mechanism is not certain, the chlorinating agent appears to shift equilibrium of the chlorosulfonation reaction, perhaps by limiting the concentration of released acid. At any rate, I have found that my method preferably yields between 0.90 and 2.0 sulfonylchloride groups per aromatic ring, significantly above the approximately 0.7 to 0.97 groups obtainable by reaction under the same conditions with chlorosulfonic acid alone (with undesirable sulfonic acid group at about 0.05 to 0.2).

Amidation of the polystyrene sulfonylchloride resin produces a weak base ion exchange resin or, in the case of a protected amine reactant, a precursor thereof. To obtain the highly useful anion resins of the invention it is important that the amidating agent be a polyamine which contains one, but only one, primary or seconday amine group, preferably a secondary amine group (when making a weak base resin), for attaching the polyamine to the sulfonyl group of the polystyrenyl sulfonylchloride. Additional primary or secondary amine groups in the polyamine can lead to secondary crosslinking and hence inferior kinetic performance, capacity, etc. Secondary crosslinking may be illustrated with a composition derived from diethylenetriamine (NH$_2$CH$_2$CH$_2$NHCH$_2$CH$_2$NH$_2$) as the amidating agent as follows:

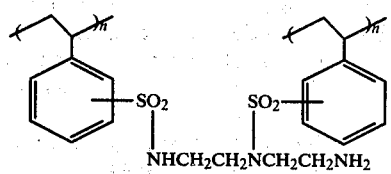

III

A polyamine having two or more primary or secondary amine groups may, however, be used as the amidating agent by the present invention if it is chemically possible to protect or block all but one of said groups. Using the diethylenetriamine illustrated above, it is possible to form a urea by known methods, thereby inactivating two of the three reactive groups:

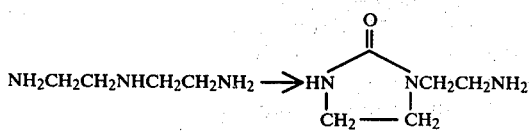

IV

Anion exchange resins produced by amidating with this blocked amine and thereafter unblocking the amine groups have been found to have about 35% higher weight capacity for anion exchange than resins derived directly from diethylenetriamine (see III above).

Other urea-type protected amines include, for example:

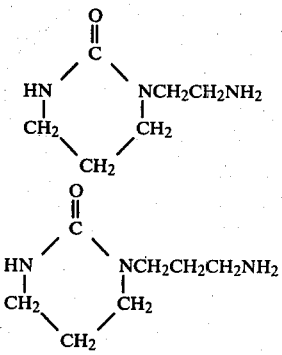

V

VI

Another procedure for protecting primary amine groups (other than the group needed) involves the preliminary formation of an imine, such as

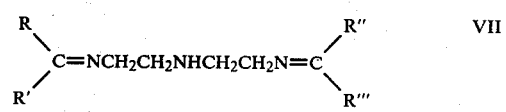

VII or

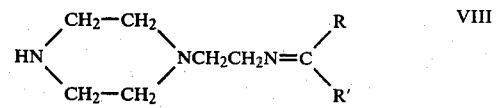

VIII wherein R, R', R", and R''' are independently selected from hydrogen and substituted or unsubstituted straight or branched chain lower alkyl or aromatic radicals. Suitable substituents are those which will not either interfere with imine formation or the amidation reaction.

The protected amine is unblocked after amidation and thereafter subjected to reductive methylation, if necessary, to substitute alkyl groups for any hydrogens in the amine groups still containing hydrogen. The above-disclosed imines may be unblocked, for example, by treatment with 1 molar HCl at 50° C. for about 2 hours. The urea-blocked amines shown above may be unblocked, for example, by hydrolysis with aqueous caustic (40% NaOH) at 120° C. Reductive methylation is needed after hydrolysis when using blocked amines such as the imine of formula VII above. This may be accomplished by treating an aqueous slurry of the hydrolyzed amine resin with formaldehyde (e.g., 37% aqueous sol'n) followed by formic acid.

The polyamine, in addition to the single reactive primary or secondary amine group must contain one or more other amine group, specifically tertiary amine groups or unreactive (protected) amine groups which may be subsequently converted to tertiary amine groups. The presence of basic nitrogens bearing hydrogens, i.e., primary or secondary amines in the final anion exchange resin results in unsatisfactory performance, including high rinse requirement for the resin and oxidative instability. To produce strongly basic anion resins, the amine groups of a weakly basic resin are converted by well-known techniques to quaternary ion exchange functional groups (see equation I above).

A novel optional process for producing strongly basic resins or resins with mixtures of weak base and strong base functional groups involves a multi-step reaction which may be illustrated by the following simplified equation (starting from the reaction product of polystyrenyl sulfonylchloride with 3-dimethylaminopropylamine) (DMAPA):

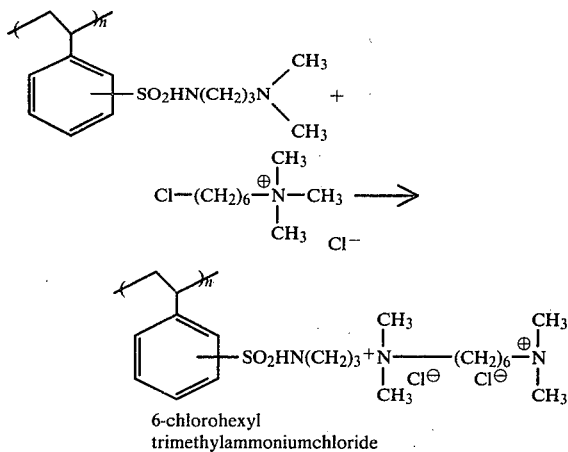

6-chlorohexyl trimethylammoniumchloride

This process may be used to produce a variety of quaternary resins or those with mixtures of quaternary and tertiary amine groups. For example, dimethylaminoethylchloride may be substituted for the quaternization reactant in the above reaction to yield a mixed weak base-strong base ion exchange resin. The reaction is generally performed at about 25°-100° C. and a pH of 7.5-10.0 with water or methanol or mixtures thereof used as solvent. To neutralize any acid formed, a base is desirably used in the reaction mixture.

The novel anion exchange resins disclosed herein prepared by the preferred process of the invention have physical and performance properties generally superior to the chloromethylether (CME)-derived resins of the prior art and hence constitute a significant advance in the field of ion exchange. Both gel and macroporous (MR) strong base resins based on DMAPA have column capacities for deacidification and desilicization with 5% of commercial grades of CME resins, when at 65% of the weight capacity of CME resins. The utilization of active sites in the sulfonamide amine (SAA) resins is thus significantly higher than conventional CME resins. The thermal stability of SAA strong base resins is not detectably different from conventional type 1 strong base resins at 50° C. after 84 days. At both 50° C. and 90° C. the SAA resins are significantly more stable than both type II CME based resins and acrylic strong base resins. The hydrolytic stability of the sulfonamide linkage in both acidic and basic media is excellent. When prepared using a preferred polyamine, the SAA resins are capable of as much as 20-30% higher column capacities than conventional prior art resins. In addition to greater utilization of anion exchange sites, the SAA resins have two physical characteristics which distinguish them from conventional resins, namely, (1) higher physical stability and (2) higher density (2-7%).

In general, the polyamines which may be used in the amidation reaction are those polyamines containing a single reactive primary or secondary amine group and at least one other functional amine group or a precursor thereof. The unprotected polyamines fall within the following general classes:

Weak Base Resins:

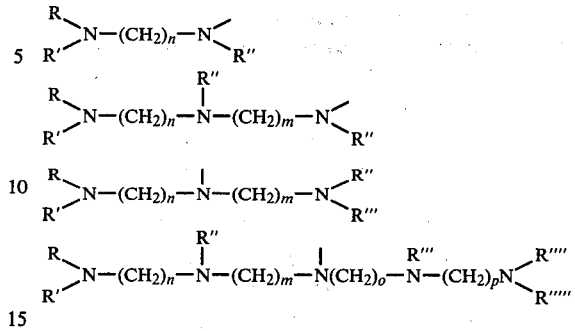

wherein each of R, R', R'', R''', R'''', and R''''' are independently selected from lower alkyl or aromatic groups, but preferably are methyl or ethyl groups and n, m, o, and p are whole numbers from 2 to 10, preferably 2 to 6.

Strong Base Resins:

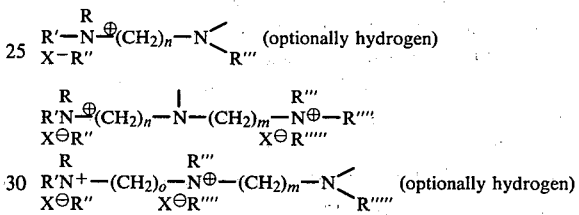

wherein R, R', R'', R''', R'''', and R''''' are independently selected from lower alkyl or aromatic groups, but preferably are methyl or ethyl groups, n and m are whole numbers from 2 to 10, preferably 2 to 6, and o is a whole number from 3 to 10, preferably 3 to 6. Compounds wherein o is 2 in the preceeding formula are generally thermally unstable. The counter-ion of the quaternary nitrogen which may be, for instance, halogen, hydroxyl, $SO_4=$, acetate or the like, is represented as $X^-$.

Illustrative of the unprotected polyamines are:
3-dimethylaminopropylamine (DMAPA)
1,1,5-trimethyliminobispropylamine (TIBP)
1,1,7,7-tetramethyldiethylenetriamine (TMDT)
1,1,9,9-tetramethyliminobispropylamine (TMIP)
5,12-dimethyl-1,5,12-triazatridecane (DTT)
N,N-dimethylethylenediamine
N,N,N'-trimethylethylenediamine
N,N,N'-trimethyl-1,3-propanediamine
2,5-dimethyl-2,5,8-triazaoctane
1,1,4-trimethyldiethylenetriamine
2,6-dimethyl-2,6,9-triazanonane
2,6-dimethyl-2,6,10-triazadecane
2,7-dimethyl-2,7,11-triazaundecane
2,5-dimethyl-2,5,9-triazanonane
N-(2-dimethylaminoethyl)piperazine
N-(2-aminoethyl)-N'-(methyl) piperazine The preferred polyamines are those having relatively high density of amine groups and shorter alkyl or alkylene groups, or said another way, the maximum number of functional groups for a given molecular weight. Typical of preferred amines are
3-dimethylaminopropylamine (DMAPA), 1,1,9,9 tetramethyliminobispropylamine (TMIP) and aminoethylethylene urea (a protected amine).

The polystyrenyl sulfonylchloride resin (intermediate) and the sulfonamide ion exchange resins derived from the same are hard infusible copolymers normally produced by suspension polymerization of monomer mixtures as discrete spherical particles or beads. Depending upon the method of polymerization, such resins may be either in "gel" (microporous) or macroreticular (macroporous) forms. These distinct physical forms, however, do not substantially influence the reactions of the present invention. Further, I have established that chlorosulfonation and amidation as taught herein may be accomplished by the same general procedures on both forms with only possibly minor differences in reaction kinetics due to the obvious differences in porosity.

The polymeric backbone of the ion exchange resins of the invention and intermediate, therefore, are cross-linked using any of the various crosslinking materials known heretofore. Typically, however, the crosslinking is produced by using a minor amount, e.g., 1.0% to 20.0%, of a polyvinyl comonomer in the polymerization of the styrene monomer. In general, the crosslinking monomer will comprise between about 1.0% and 50.0% of the monomer mixture, preferably between about 1.0% and 20.0% and more preferably between about 1.0% and 10.0% of the total monomer mixture. Among the crosslinking polyvinyl monomers useful for preparing the polystyrenyl backbone are divinyl benzene, trimethylolpropane trimethacrylate, ethylene glycol dimethacrylate, divinyl toluene, trivinyl benzene, divinyl chlorobenzene, diallyl phthalate, and the like. In commercial applications divinyl benzene is perhaps the crosslinker of choice today and hence a preferred material. Polyfunctional crosslinkers containing ether linkages and other groups known to be unstable to chlorosulfonic acid are, of course, to be avoided.

Other than considerations of cost, solvents are not required, although preferred, in the chlorosulfonation and amidation reaction. The use of excess chlorosulfonic acid or polyamine obviates the need for solvent.

In the chlorosulfonation reaction solvents may be used which do not react with chlorosulfonic acid or any chlorinating agent present. Illustrative of such solvents are the aliphatic hydrocarbons such as n-octane, n-nonane, and n-decane and the chlorinated saturated hydrocarbons such as ethylene dichloride (EDC) and 1,2-propylene dichloride. The chlorinated materials are preferred since they tend to swell the resin and thereby aid reaction kinetics.

Chlorinated hydrocarbons and ketones are suitable solvents for the amidation reactions, examples of the former being ethylene dichloride, 1,2-propylene dichloride, chlorobenzene and examples of the latter being acetone, methyl ethyl ketone, and methyl isobutyl ketone. The ketones are preferably used with only the secondary amines.

In the quaternization reaction water and/or methanol serve as the solvent. During hydrolysis and reductive methylation of a protected amine water is required.

In the chlorosulfonation of the crosslinked polystyrenyl backbone it is preferable to use at least one mole of chlorosulfonic acid for each mole of polymer (based on aromatic rings), preferably 1.2 to 4.0 moles. An even greater excess of chlorosulfonic acid has been found to be acceptable. A minimum of 0.1 moles of chlorinating agent is needed for reduction of sulfonic acid groups, preferably 1.2 to 4.0 moles per mole of polymer. Further, I prefer to use either equal mole ratios of chlorosulfonic acid and chlorinating agent (e.g., =1.0 moles of each) or any excess of chlorosulfonic acid (e.g., =2.0 moles) and a lesser amount (e.g., =0.1 moles) of the normally more expensive chlorinating agent. At any rate, to obtain a preferred product of the invention the sum of the two reactants should equal at least 2.0 moles/mole of polymer, preferably higher reactant ratios being useful to obtain the preferred higher levels of sulfonyl chloride substitution in the aromatic ring.

At least one mole of amine is needed pre mole of sulfonyl chloride in the polymer to obtain complete amidation, preferably 1.1 to 2.0 moles. Large excesses of amine have no detrimental effect on the amidation reaction. A base may also be used to neutralize excess HCl generated during amidation, e.g., 1 mole of NaOH or $Na_2CO_3$/mole of HCl liberated.

In the quaternization reaction, a minimum of 1.0 mole of methyl chloride is needed per mole of amine groups in the intermediate if quantitative conversion is desired. Of course, mixed functionality in the final product may be desired and hence smaller amounts of methyl chloride will be required. Large excesses of methyl chloride have not been found detrimental to the reaction. A minor amount, e.g., 0.2 moles/mole of product of $Na_2CO_3$ helps to eliminate any HCl produced by hydrolysis of methyl chloride.

In the hydrolysis of protected amines (urea protected) an aqueous 40% NaOH solution has been found suitable. Other concentrations will undoubtedly achieve the same desired result. In the reductive methylation of the hydrolyzed amine a solution of 1.0 mole of formic acid and 1.0 mole formaldehyde per N-H hydrogen to be replaced is the minimum required. An excess of each is normally desirable.

Except for reductive methylation, it is desirable to conduct the above described reactions under a nitrogen blanket and with a slight positive pressure. The temperatures at which the reactions proceed will vary depending upon the particular reactants with typical ranges of about as set forth below:

| Chlorosulfonation | 20°–60° C. |
|---|---|
| Amidation | Room temp. - 130° C. |
| Quaternization | 30°–80° C. |
| Hydrolysis | 90°–150° C. |
| Reductive Methylation | 20°–100° C.* |

*the temperature is preferably increased gradually or incrementally over the term of several hours

EXAMPLE 1

Preparation of a Weak Base Resin

A typical resin matrix material, beads of a crosslinked gel copolymer of styrene containing 2.1% divinyl benzene is subject to a representative chlorosulfonation technique as follows:

Fifty grams of the copolymer and 425 ml. 1,2-dichloroethane are charged to a 3-liter, three-necked flask equipped with mechanical stirrer, thermometer, reflux condenser, dropping funnel, and nitrogen sparge. The suspension is stirred for 30 minutes, and then 1560 ml. chlorosulfonic acid are added thereto over a 30 minute period. The suspension is stirred overnight at room temperature, then washed batchwise with three 500 ml. aliquots each of dichloroethane and acetone. The chlorosulfonated polymer is treated in a column with ten bed volumes of acetone, ten volumes of dichloroethane, and finally ten more bed volumes of acetone. Three-fifths of this material, a slurry of chlorosulfonated copolymer beads in acetone, is then subjected to amidation by adding 156 grams of 1,1,9,9-tetramethyliminobispropylamine thereto in a one liter flask equipped as in the earlier reaction flask. There is a 14° rise in temperature over a 30 minute period owing to heat of reaction. The slurry is stirred overnight at room temperature, then freed of acetone and unreacted amine by treatment in a column with ten bed volumes each of methanol and water. The recovery of the weak base resin product is 159.5 g. of wet material (55.6% solids) or a dry yield of 88.7 g.

EXAMPLE 2

Preparation of a Strong Base Resin 79.8 grams of the wet weak base resin prepared in accordance with Example 1 are charged with 300 ml. deionized water to a 2-liter, stainless steel Parr bomb equipped with heating mantle, stirrer, thermometer and pressure gauge. The pH of the suspension is adjusted to about 10 with 2.5 g. $Na_2CO_3$, the slurry temperature is raised to 50° C., and methyl chloride is added from a cylinder to a pressure of 50 psig, and thereupon added incrementally over a 15 hour period to maintain pressure. Then the mixture is cooled, the bomb flushed with nitrogen, the resin removed and column treated with ten bed volumes of deionized water. Recovery is 124.8 g. of wet product (44.8% solids, 55.9 g. dry product) of a strong base resin of the structure:

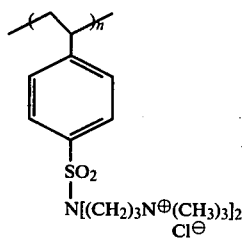

EXAMPLE 3

Another typical resin matrix material, beads of a macrorecticular copolymer of styrene with 3.0% divinyl benzene is chlorosulfonated substantially as in Example 1, then amidated as follows: To a suspension of approximately 6 grams of the polystyrenyl sulfonyl chloride resin in 100 ml. of chlorobenzene heated to 50° C. is added 32.8 g. of aminoethylene urea. The mixture is stirred overnight at 50° C. and at 100° C. for three hours, then cooled and the product washed three times each with methanol and water. The resin is hydrolyzed by heating at 120° C. for two days with 167 ml. of 50% NaOH solution. The suspension is cooled and the resin washed with deionized water, then subjected to a reductive methylation as follows. 113.8 g. of 37% formaldehyde solution is stirred at 30° C. for 30 minutes. 81 g. formic acid is added, and the mixture is heated to 90° C. where it is held for two hours and cooled. The resin is washed with methanol, then 4% HCl solution and finally deionized water. The product is a weak base ion exchange resin which is produced above according to the following reaction scheme:

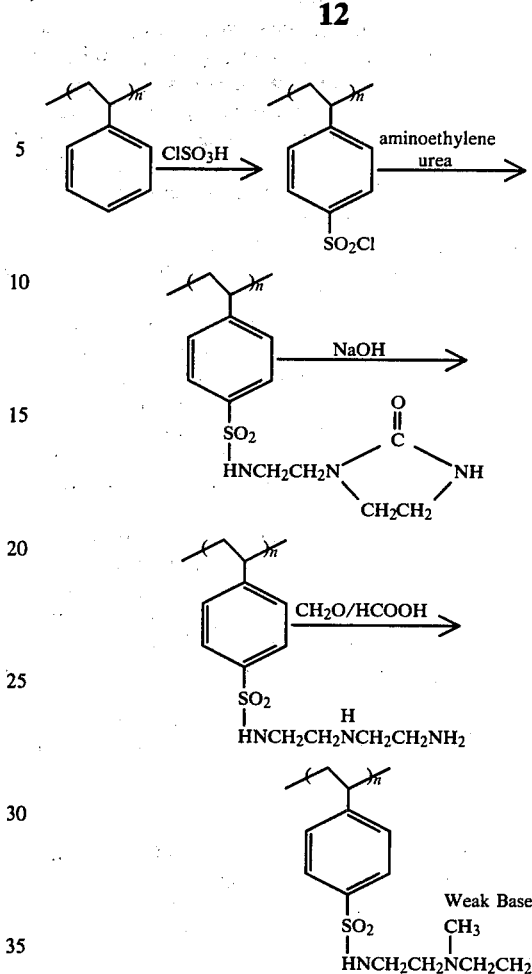

EXAMPLE 4

Preferred Chlorosulfonation Procedure

Fifty grams of a commercial grade of styrene/divinyl benzene gel copolymer resin (2.1% DVB) are added to 50 ml. of ethylene dichloride contained in a 1 liter, 3 necked flask equipped as in Example 1 after which a solution of 128 ml. of $ClSO_3H$ is added. An exotherm of five degrees (25° C. to 30° C.) and evolution of gas are observed. One hundred forty six mls. of thionyl chloride ($SOCl_2$) is added next resulting in an exotherm to 40° C. and evolution of more gas. At this point 102 mls. of ethylene dichloride is added to maintain fluidity. An additional 75 ml. of ethylene dichloride is added 30 minutes later. The reaction mixture is heated over about 45 minutes to 60° C. and held at that temperature overnight. The product resin is batch washed with EDC and acetone, column treated with 10 BV each of acetone, EDC and methyl ethyl ketone, the latter being the solvent for amidation.

EXAMPLE 5

Following the general procedure of Example 4, above, a reactant mixture of 1.2 moles of chlorosulfonic acid, 1.3 moles of thionyl chloride and 1 mole of styrene/DVB (2.1% by weight) crosslinked copolymer heated to 60° C. and maintained overnight yields an intermediate polystyrene sulfonyl chloride containing approximately 1.1 sulfonyl chloride groups per mole of resin (aromatic groups).

EXAMPLE 6

When 2.0 moles each of chlorosulfonic acid and thionyl chloride are used in the process of Example 5, per mole of resin, the product produced contains approximately 1.4 sulfonyl chloride groups per mole of resin.

EXAMPLE 7

When Example 6 is repeated using a more lightly crosslinked copolymer starting material (e.g., 1% divinylbenzene) the number of sulfonyl chloride groups per mole of resin is increased.

EXAMPLE 8

A resin is produced in accordance with Example 1 having 5.5 milliequivalents sulfonic acid groups/gram of resin (dry basis).

EXAMPLE 9

A resin is produced in accordance with Example 4 having more than 5.5 milliequivalents of sulfonic acid groups/gram of resin (dry basis).

EXAMPLES 10–23

Following the procedures disclosed hereinabove, a group of weak base styrene/DVB resins were produced having the properties set forth in Table 1. Examples 20–22 represent commercially available weak base resins supplied as controls.

TABLE I

Properties of Sulfonamide Amine Weak Base Resins

| Example No. | Resin Copolymer Type | Amine[2] | Total Anion Exchange Capacity (meq/g dry) | Solids % | Whole Bead Count Whole/Cracked/Fragments | True Wet Density Free Base (g/cc) | True Wet Density HSO4- (g/cc) |
|---|---|---|---|---|---|---|---|
| 10 | MR  | TMIP  | 4.72 | 43.5 | —        | 1.065   | 1.121 |
| 11 | MR  | TMIP  | 4.73 | 43.4 | —        | 1.063   | —     |
| 12 | Gel | TMIP  | 5.02 | 48.0 | 100/0/0  | 1.075   | —     |
| 13 | Gel | TMIP  | 5.15 | 48.3 | —        | —       | —     |
| 14 | Gel | TMIP  | 5.09 | 54.0 | —        | —       | —     |
| 15 | Gel | TMIP  | 5.37 | 53.5 | —        | —       | —     |
| 16 | MR  | TIBP  | 5.26 | 49.2 | 96/0/4[1] | 1.090[1] | 1.142 |
| 17 | MR  | TIBP  | 4.98 | 51.6 | 96/0/4[1] | 1.090[1] | 1.142 |
| 18 | MR  | DTT   | 4.50 | 56.3 | —        | 1.074   | 1.120 |
| 19 | MR  | AEEU  | 5.14 | 50.6 | 96/1/3   | 1.113   | 1.163 |
| 20 | MR  | DMA   | 4.86 | 43.9 | 99/0/1   | 1.037   | 1.092 |
| 21 | MR  | DMA   | 4.80 | 43.0 | 99/0/1   | 1.034   | —     |
| 22 | MR  | DMA   | 4.78 | 36.7 | —        | —       | —     |
| 23 | MR  | TMDT  | 5.44 | 43.6 | 98/1/0   | —       | 1.124 |

[1]These numbers represent minimum values as the resins were subjected to several types of cycling before the reading was made.
[2]DMA-dimethylamine
TMDT-1,1,7,7-tetramethyldiethylenetriamine
AEEU-aminoethylethylene urea

EXAMPLES 24–39

Following the procedures disclosed hereinabove, a group of strong base styrene/DVB resins were produced having the properties set forth in Table II. Examples 24, 33 and 34 represent commercially available strong base resins, supplied as controls.

TABLE II

Properties of Sulfonamide Amine Weak Base Resins

| Example No. | Resin Copolymers Type | Amine | Total Anion Exchange Capacity (meq/g dry) | True Strong Base (meq/g dry) | Solids (%) | True Wet Density (g/cc,Cl−) |
|---|---|---|---|---|---|---|
| 24 | Gel | TMA*  | 4.45 | 4.42 | 44.6 | 1.076 |
| 25 | Gel | DMAPA | 2.90 | 2.68 | 45.3 | 1.111 |
| 26 | Gel | DMAPA | 2.84 | 2.84 | 40.8 | —     |
| 27 | Fel | DMAPA | 3.00 | 2.68 | 46.1 | —     |
| 28 | Gel | DMAPA | 2.91 | 2.73 | 37.2 | —     |
| 29 | Gel | TMIP  | 3.98 | 4.01 | 43.4 | 1.094 |
| 30 | Gel | TMIP  | 3.95 | 4.06 | 44.5 | —     |
| 31 | Gel | TMIP  | 4.01 | 4.12 | 35.2 | —     |
| 32 | Gel | TMIP  | 4.06 | 4.07 | 35.5 | 1.080 |
| 33 | MR  | TMA   | 4.47 | 4.43 | 36.3 | 1.065 |
| 34 | MR  | TMA   | 4.33 | 4.24 | 35.3 | —     |
| 35 | MR  | DMAPA | 2.88 | 2.88 | 33.8 | 1.079 |
| 36 | MR  | DMAPA | 2.85 | 2.72 | 26.6 | —     |
| 37 | MR  | TMIP  | 3.86 | 3.79 | 37.5 | —     |
| 38 | MR  | TIBP  | 4.05 | 3.80 | 40.8 | 1.094 |
| 39 | MR  | DTT   | 3.55 | 3.48 | 38.9 | 1.080 |

*TMA = Trimethylamine

Thermal stability studies of the resins of Examples 31 and 36 compared to typical commercial acrylic strong base resins have proved the superiority of the sulfonamide amine resins. The resins were heated in a 4% NaOH solution at 50° C. and tested for total strong base capacity (TSB).

TABLE III

| Resin | Time | % TSB | % Loss TSB |
|---|---|---|---|
| Commercial Acrylic/DVB Strong Base | 0 | 89.6 | — |
| Commercial Acrylic/DVB Strong Base | 1 wk. | 80.3 | |
| Commercial Acrylic/DVB Strong Base | 2 wks. | 78.0 | 15.2 |
| Commercial Acrylic/DVB Strong Base | 5 wks. | 67.8 | 30.4 |

TABLE III-continued

| Resin | Time | % TSB | % Loss TSB |
|---|---|---|---|
| Commercial Acrylic/DVB Strong Base | 165 days | 34.1 | 68.0 |
| Example 31 | 0 | 100 | — |
| " | 22 days | 100 | |
| " | 44 days | 97 | 2.0 |
| " | 89 days | 94 | 4.2 |
| Example 36 | 0 | 95.4 | — |
| " | 1 wk. | 91.7 | |
| " | 3 wks. | 96.4 | 0.4 |
| " | 5 wks. | 95.2 | 4.8 |
| " | 52 days | 91.5 | 8.8 |
| " | 84 days | 90.8 | 12.5 |
| " | 165 days | 92.3 | 12.1 |
| Commercial Styrene/DVB | 0 | 99.1 | — |
| " | 2 wks. | 98.1 | 5.9 |
| " | 84 days | 95.1 | 11.7 |
| " | 165 days | 94 | 15.1 |

EXAMPLE 40

Forty two ml. of ethylene dichloride (EDC) and five grams of a macroreticular styrene/DVB copolymer (3.0% DVB) is placed in a three necked flask to swell the copolymer for one half hour, after which 156 mls. of chlorosulfonic acid is added. The mixture is stirred overnight at room temperature. The polystyrenyl sulfonylchloride resin product is batch washed three times each with EDC and acetone then column treated with 10 bed volumes (BV's) each of acetone, EDC and chlorobenzene. The washed resin is placed in a 250 ml. flask with 100 mls. of chlorobenzene and 34.2 grams of TIBP. The mixture is heated to 130° C. and held for 64 hours. After cooling, the resin is column treated with 1 l. each of methanol and D.I. water. The wet yield is 26.7 grams. Twenty grams of the resin and 300 mls. of D.I. water and 1.5 grams of $Na_2CO_3$ (pH 11) were placed in a pressure reactor heated to 50° C. and pressurized to 50 p.s.i.g. with methyl chloride and held overnight under such conditions. The reaction is cooled, the reactor is flushed with $N_2$, and the resin removed and column treated with 1 l. of D.I. water. The yield is 30.2 grams of resin, wet basis.

EXAMPLE 41

The capacity of the sulfonamide amine resin of the previous example is compared to a commercially important Styrene/DVB strong base anion exchange resin produced by the known CME route. The results follow:

Table IV

| Sample | Type | Amine | Column Flow Rate (gpm/ft.$^3$) | Regenerate Level (lbs. NaOH/ft.$^3$) | Capacity (Kgr as $CaCO_3$/ft.$^3$ |
|---|---|---|---|---|---|
| Commercial strong base | MR | TMA | 2 | 25 | 16.8 |
| Resin (CME) | " | " | 2 | 4 | 9.4 |
| Resin of Example 40 (Sulfonamide amine) | MR | TIBP | 2 | 25 | 20.7 |
| | " | " | 2 | 4 | 15.1 |

These data show that the resins of the invention are capable of having somewhat higher capacities than existing commercial resins, especially at the lower regenerant level (4 lbs. NaOH/ft.$^3$) which would be more practical for industrial use.

EXAMPLE 42

The purpose of this example is to illustrate preparation of a high capacity gel weak base resin by the process of the invention.

To a 1 liter, three necked flask are added 15 mls. of ethylene dichloride and 38.4 mls. of chlorosulfonic acid. Fifteen grams of a styrene/DVB resin are added to the stirred mixture of solvent and $ClSO_3H$. After the reaction mixture exotherms and evolves gas, 43.8 mls. of thionyl chloride temperature and evaluation of gas. The reaction mixture is thereafter heated slowly to 60° C. and held at that temperature for 16 hours. The washed resin recovered is thereafter amidated with excess TMIP, with a resultant exotherm from 24° C. to 35° C. over a 45 minute period. The resin is batch washed with D.I. $H_2O$ and then methyl alcohol, and then column treated with 10 BV's of MeOH and 10 BV's of $H_2O$. A yield of 90 grams (wet basis) of resin was obtained with 51.4% solids. The resin is found to have an anion exchange capacity of 5.37 meq/g (dry basis).

EXAMPLE 43

Following the procedures disclosed hereinabove, resins were prepared having relatively low weight capacities (i.e., "a" in general formula between 0.7 and 0.9). The resins were found to have good ion exchange performance characteristics. The properties are summarized below:

| Resin | | Properties | | |
|---|---|---|---|---|
| Copolymer Type | Amine Reactant | Total Anion Exchange Capacity (meq/g dry) | True Strong Base Capacity (meq/g dry) | Solids % |
| Gel | TMIP | 3.57 | 3.47 | 57.8 |
| Gel | TMIP | 3.41 | 3.32 | 59.3 |

I claim:

1. As a novel composition crosslinked polystyrenyl sulfonamide anion exchange resin substantially free of secondary crosslinking and having a general formula:

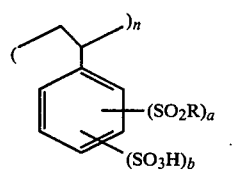

wherein the expression

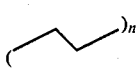

is used to denote a polymer chain, R is selected from polyamines and quaternary ammonium salts, in either case containing a single primary or secondary amine group which is linked to the sulfonyl group of the polymer, and also containing at least one functional ion exchange group selected from tertiary amine and quaternary ammonium groups and mixtures thereof, a is a number between about 0.7 and 2.0 and b is a number between about 0 and 0.4.

2. The anion exchange resin of claim 1 wherein R is N[CH₂CH₂CH₂N(CH₃)₂]₂.

3. The anion exchange resin of claim 1 wherein R is N[CH₂CH₂CH₂N⁺$^{CL}$₋(CH₃)₃]₂.

4. The anion exchange resin of claim 1 wherein R is

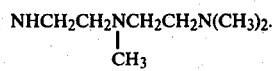

NHCH₂CH₂NCH₂CH₂N(CH₃)₂.
      |
      CH₃

5. The anion exchange resin of claim 1 wherein R is (CH₃)₂NCH₂CH₂CH₂NH.

6. The anion exchange resin of claim 1 wherein R is

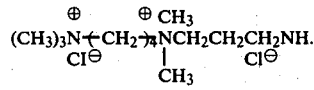

⊕         ⊕ CH₃
(CH₃)₃N⁻(-CH₂-)ₙNCH₂CH₂CH₂NH.
        Cl⊖       |        Cl⊖
                  CH₃

7. The anion exchange resin of claim 1 wherein R is [(CH₃)₂NCH₂CH₂]₂N.

8. The anion exchange resin of claim 1 wherein R is

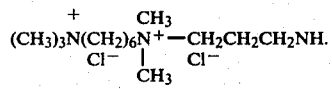

+       CH₃
(CH₃)₃N(CH₂)₆N⁺—CH₂CH₂CH₂NH.
       Cl⁻    |      Cl⁻
              CH₃

9. A crosslinked polystyrenyl sulfonylchloride resin substantially free of sulfonic acid groups and containing between 0.7 and 2.0 sulfonyl chloride groups for each styrene group and no more than 0.2 sulfonic acid groups per styrene group, when prepared from an insoluble crosslinked copolymer comprising between about 1.0% and 20% by weight of the copolymer of a polyvinyl comonomer crosslinking agent.

10. A process for preparing a polystyrenyl sulfonylchloride resin substantially free of sulfonic acid groups and containing between 0.7 and 2.0 sulfonyl chloride groups for each aromatic ring which comprises reacting chlorosulfonic acid with a crosslinked polystyrene in the presence of a chlorinating agent.

11. The process of claim 10 wherein the chlorinating agent is thionyl chloride.

12. The process of claim 10 wherein the chlorinating agent is sulfur dichloride.

13. The process of claim 10 wherein the chlorinating agent is sulfur monochloride.

14. The process of claim 10 wherein the crosslinked polystyrene is a copolymer comprising 80–99% styrene with 20–1% by weight of divinylbenzene.

15. The process of claim 10 wherein the chlorinating agent is present in an amount of about one mole of chlorinating agent per mole of chlorosulfonic acid.

16. A process for preparing a crosslinked polystyrenyl anion exchange resin substantially free of secondary crosslinking and having the general formula:

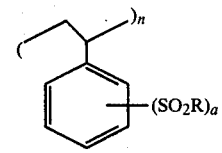

wherein the expression

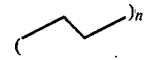

is used to denote a polymer chain, a is a number between about 0.7 to 2.0, and R is selected from polyamine and quaternary ammonium salts, in either case containing a single primary or secondary amine group which is linked to the sulfonyl group of the polymer, and also containing at least one functional ion exchange group selected from tertiary amine and quaternary ammonium groups and mixtures thereof, which comprises amidating under anhydrous conditions a crosslinked polystyrenyl sulfonylchloride resin with a polyamine containing a single reactive primary or secondary amine group and at least one functional ion exchange group, or precursor thereof, selected from tertiary amine or protected amine groups, using at least one mole of polyamine per mole of sulfonyl chloride and thereafter converting any protected amine groups to tertiary amine groups and optionally quaternizing one or more of the tertiary amine groups to ammonium groups.

17. The process of claim 16 wherein the crosslinked polystyrenesulfonylchloride resins reactants contains no more than 0.2 sulfonic acid groups per aromatic ring.

18. The process of claim 16 wherein R is a polyamine.

19. The process of claim 16 wherein R is a quaternary ammonium salt.

20. The process of claim 16 wherein R contains both tertiary amine groups and quaternary ammonium salt groups.

21. The process of claim 16 wherein a is equal to 0.9 to 1.5.

* * * * *